United States Patent
Sharma et al.

(10) Patent No.: US 10,755,336 B2
(45) Date of Patent: Aug. 25, 2020

(54) METHOD AND SYSTEM FOR ELECTRONIC PURCHASE REMINDERS

(71) Applicant: Mastercard International Incorporated, Purchase, NY (US)

(72) Inventors: Prashant Sharma, Madison, NJ (US); Joseph Hayes, Montclair, NJ (US); Manash Bhattacharjee, Jersey City, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 263 days.

(21) Appl. No.: 15/830,149

(22) Filed: Dec. 4, 2017

(65) Prior Publication Data

US 2019/0172117 A1 Jun. 6, 2019

(51) Int. Cl.
*G06Q 30/06* (2012.01)
*G06F 16/2457* (2019.01)

(52) U.S. Cl.
CPC ... *G06Q 30/0631* (2013.01); *G06F 16/24573* (2019.01); *G06F 16/24575* (2019.01)

(58) Field of Classification Search
None
See application file for complete search history.

(56) References Cited

U.S. PATENT DOCUMENTS

| | | | | |
|---|---|---|---|---|
| 5,909,023 A | * | 6/1999 | Ono | G06Q 10/087 235/380 |
| 9,619,831 B1 | * | 4/2017 | Kumar | G06Q 30/0631 |
| 2002/0143364 A1 | * | 10/2002 | Burkhart | A61B 17/0401 606/232 |
| 2005/0125309 A1 | * | 6/2005 | Song | G06Q 10/1093 705/7.18 |

(Continued)

OTHER PUBLICATIONS

How to add customer recurring tasks to the apple reminders app; Lee Peterson, https://theappfactor.com/create-recurring-reminders-iphone-ipad/, May 2, 2016 (Year: 2016).*

*Primary Examiner* — Ming Shui
(74) *Attorney, Agent, or Firm* — Buchanan Ingersoll & Rooney PC (57) ABSTRACT

A method for providing electronic purchase reminders includes: storing communication information and a plurality of transaction data entries, each transaction data entry corresponding to a processed payment transaction and including transaction data, a transaction date, and one of a plurality of category tags; storing, for each category tag, a recurring time period; identifying a subset of transaction data entries that includes a common category tag; identifying a most recent transaction data entry of the subset o based on the transaction date, where a difference between the transaction date included in the most recent transaction data entry and a present date is at least the recurring time period associated with the common category tag; generating a purchase recommendation based on the transaction data included in each transaction data entry in the subset; and transmitting the generated purchase recommendation to a computing device based on the communication information.

16 Claims, 5 Drawing Sheets

(56) References Cited

U.S. PATENT DOCUMENTS

| | | | | |
|---|---|---|---|---|
| 2009/0271246 A1* | 10/2009 | Alvarez | ................. | G06Q 30/02 |
| | | | | 705/7.29 |
| 2012/0109749 A1* | 5/2012 | Subramanian | ..... | G06Q 30/0255 |
| | | | | 705/14.53 |
| 2015/0012425 A1* | 1/2015 | Mathew | ............... | G06Q 20/227 |
| | | | | 705/41 |
| 2015/0142514 A1* | 5/2015 | Tutte | .................. | G06Q 30/0269 |
| | | | | 705/7.31 |
| 2015/0193789 A1* | 7/2015 | Gerard | ................... | H04W 4/21 |
| | | | | 705/7.31 |
| 2015/0332285 A1* | 11/2015 | Unser | ................... | G06Q 30/02 |
| | | | | 705/7.29 |

* cited by examiner

METHOD AND SYSTEM FOR ELECTRONIC PURCHASE REMINDERS

FIELD

The present disclosure relates to the providing of electronic purchase reminders, specifically the use of tags associated with recurring processed payment transactions for use in providing reminders and recommendations when a future transaction matching a tag is expected to occur.

BACKGROUND

Consumers conduct payment transactions on a fairly regular basis. Some payment transactions may arise from random or otherwise unpredictable circumstances: a new gadget may be released that the consumer is interested in and goes to purchase. Other payment transactions may be recurring, where the same or a similar payment transaction may be regularly conducted at a predetermined interval. For example, a consumer may pay to have their vehicle serviced every four months, may pay for a dental cleaning every six months, may take a vacation on the same week every year, may purchase an anniversary gift before their wedding anniversary every year, and may purchase birthday gifts for friends and family at the appropriate times each year.

While consumers often budget for these types of transactions (e.g., putting money away throughout the year for gift purchases), budgets do not necessarily provide consumers with reminders of an upcoming purchase. Instead, consumers often have to set reminders themselves, such as by using a calendar service that the consumer may use to manage other appointments and events. However, although a calendar may serve to remind the consumer of an upcoming purchase that needs to be made, such as the approach of an anniversary for which the consumer needs a gift, such reminders do no more than notify the consumer of the existence of of an upcoming event. In this example, the consumer is provided only with a reminder that an anniversary is coming up.

For busy consumers, the need to conduct a new iteration of a recurring transaction may be just one more task added to a busy schedule. In cases where a consumer is provided only with a reminder that the period for a recurring transaction has passed or is about to pass, the consumer must decide how to proceed with the transaction on their own. For instance, in the above example, the consumer has to decide what gift to buy for the anniversary no guidance unless manually set by the consumer when making the calendar appointment. Such a process may be time consuming and difficult, particularly for consumers with busy schedules.

Thus, there is a need for a technological solution where recurring payment transactions may be identified by a third party system, where the third party system is configured to also provide recommendations for future iterations of the recurring payment transactions, to save consumers both time and effort. This creates technological challenges in finding ways to capture relevant information that provides indications as to scheduling but also a basis of recommendations, analyze the data to divine the recommendations and calendar events and interact with the consumer, as in an automated fashion. This cannot be done by simply automating a manual process, but instead must involve a different way of thinking about how technology can be harnessed to provide recommendation to individual members of a large population is a way that is accurate and fast on a mass scale.

SUMMARY

The present disclosure provides a description of systems and methods for providing electronic purchase reminders. The processing server discussed herein is configured to not only identify recurring payment transactions based on their regular occurrence in a consumer's transaction history, but also identify data within each of the recurring transactions themselves. This data is used to provide a recommendation for a future iteration (which is not necessarily the purchase of the same product but rather can be an accessory or other type of related item, or simply be of the same general interest) of the recurring payment transaction when the period is set to expire, such as a recommendation for a specific product, merchant to purchase from, amount to spend, etc. Recurring payment transactions may be identified via a tagging system, where transactions are tagged automatically and/or by the consumer, where the period and other characteristics of a recurring transaction may also be automatically identified, but may also or alternatively be set or adjusted by the consumer. The result is a customizable system where a consumer can receive uniquely appropriate suggestions along with a reminder for a future payment transaction based on their history across one or multiple transaction accounts.

A method for providing electronic purchase reminders includes: storing, in an account profile of an account database of a processing server, at least communication information and a plurality of transaction data entries, wherein each transaction data entry corresponds to a processed payment transaction and includes at least transaction data, a transaction date, and one of a plurality of category tags; storing, in the account profile, for each of the plurality of category tags, a recurring time period; executing, by a querying module of the processing server, a query on the account database to identify, in the account profile, a subset of transaction data entries where the included one of the plurality of category tags is a common category tag; identifying, by a data identification module of the processing server, a most recent transaction data entry of the subset of transaction data entries based on the transaction date included in each of the transaction data entries in the subset, where a difference between the transaction date included in the most recent transaction data entry and a present date is at least the recurring time period that is associated with the common category tag in the account profile; generating, by a recommendation module of the processing server, a purchase recommendation based on at least the transaction data included in each transaction data entry in the subset; and electronically transmitting, by a transmitting device of the processing server, the generated purchase recommendation to a computing device based on the communication information stored in the account profile.

A system for providing electronic purchase reminders includes: an account profile of an account database of a processing server configured to store at least communication information and a plurality of transaction data entries, wherein each transaction data entry corresponds to a processed payment transaction and includes at least transaction data, a transaction date, and one of a plurality of category tags, and store, for each of the plurality of category tags, a recurring time period; a querying module of the processing server configured to execute a query on the account database to identify, in the account profile, a subset of transaction data entries where the included one of the plurality of category tags is a common category tag; a data identification module of the processing server configured to identify a most recent transaction data entry of the subset of transaction data entries based on the transaction date included in each of the transaction data entries in the subset, where a difference between the transaction date included in the most recent transaction data entry and a present date is at least the recurring time period that is associated with the common category tag in the account profile; a recommendation module of the processing server configured to generate a purchase recommendation based on at least the transaction data included in each transaction data entry in the subset; and a transmitting device of the processing server configured to electronically transmit the generated purchase recommendation to a computing device based on the communication information stored in the account profile.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Providing Electronic Purchase Reminders and Recommendations

Figure 1:
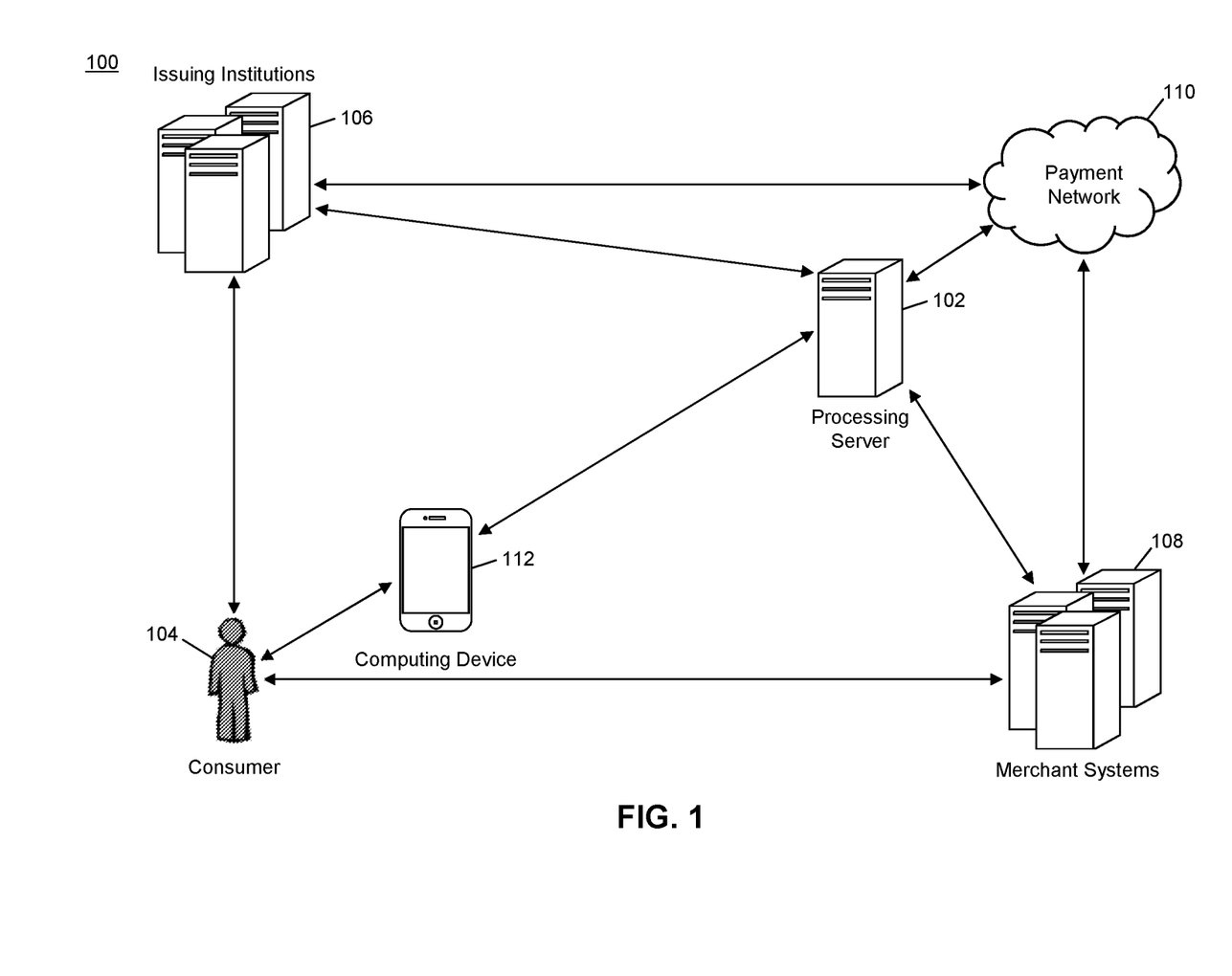
FIG. 1 is a block diagram illustrating a high level system architecture for providing electronic purchase reminders and recommendations for recurring transactions in accordance with exemplary embodiments.

FIG. 1 illustrates a system 100 for the identification of recurring electronic payment transactions and the providing of reminders and recommendations for future iterations of a recurring payment transaction based on transaction tagging and historical transaction data.

The system 100 may include a processing server 102. The processing server 102, discussed in more detail below, may be configured to provide electronic purchase reminders and recommendations therefore to a consumer 104 for recurring payment transactions involving the consumer 104. The consumer 104 may have access to one or more transaction accounts that may be used to fund electronic payment transactions. Each transaction account may be issued for use by the consumer 104 by an issuing institution 106. An issuing institution 106 may be a financial institution, such as an issuing bank, or other entity configured to issue transaction accounts that may be used to fund electronic payment transactions. As part of the issuing of a transaction account, the consumer 104, as an authorized user thereof (e.g., as the account holder or an entity authorized by the account holder) may be provided with payment credentials associated with that transaction account.

The consumer 104 may present the payment credentials to a merchant system 108 when wanting to conduct an electronic payment transaction. For example, the payment credentials may be encoded in a magnetic strip or integrated circuit of a payment card, which may be presented to and read by a merchant system 108, such as at a point of sale device. The merchant system 108 may read the payment credentials and submit an electronic payment transaction to a payment network 110 for processing using traditional methods and systems. As part of the processing of an electronic payment transaction, the payment network 110 may seek approval of a transaction by the issuing institution 106 that issued the transaction account sought to be used to fund the payment transaction, such as may be identified via the payment credentials supplied in the payment transaction. The issuing institution 106 may provide their approval or denial, as applicable, which may be communicated back to the merchant system 108 and the transaction finalized accordingly.

The processing server 102 may be configured to identify when there are recurring payment transactions occurring in the transaction history for the consumer 104 and to identify future recommendations and reminders based on these recurring payment transactions. As payment transactions are successfully processed and approved, the processing server 102 may receive transaction data for the payment transactions. In one embodiment, the processing server 102 may receive the transaction data directly from the payment network 110 used to process the electronic payment transaction. In other embodiments, the processing server 102 may receive the transaction data from the associated issuing institution 106 or other entity. The processing server 102 may be configured to group all payment transactions associated with a single consumer 104 together, such as based on common payment credentials.

In some instances, electronic payment transactions across multiple transaction accounts may be grouped together. In such instances, the processing server 102 may receive information from issuing institutions 106 and/or the consumer 104 (e.g., via a computing device 112, discussed in more detail below) used to identify when transaction accounts are both associated with a single consumer 104. For instance, the consumer 104 may indicate each of the transaction accounts they may use in electronic payment transactions to the processing server 102. In another example, a single issuing institution 106 may identify all transaction accounts for which the consumer 104 is an authorized user. In yet another example, multiple issuing institutions 106 may provide identification data to the processing server 102 for transaction accounts, where the processing server 102 may use the data to identify transaction accounts across multiple issuing institutions 106 for which the consumer 104 is an authorized user. In some embodiments, the consumer 104 may be required to first provide permission for the processing server 102 to utilize multiple transaction accounts and/or transaction accounts from multiple issuers before performing the functions discussed herein with respect to multiple transaction accounts. In some cases, the processing server 102 may be a part of an issuing institution 106 and receive transaction data via internal communication systems thereof. In other cases, the processing server 102 may be a part of a payment network 110 and may receive transaction data for electronic payment transactions conducted by that payment network 110.

The processing server 102 may receive the transaction data from the appropriate entity or entities and store it therein in an account profile associated with the transaction account(s), as discussed in more detail below. In some embodiments, the transaction data may be included in transaction messages that were used in the processing of the related electronic payment transaction that are provided to the processing server 102. A transaction message may be a specially formatted data message that is formatted in compliance with one or more standards governing the exchange of financial transaction messages, such as the International Organization of Standardization's ISO 8583 or ISO 20022 standards. A transaction message may include a plurality of data elements, where each data element is configured to store data as set forth in the associated standard(s). For instance, one data element may store a primary account number associated with the transaction account used to fund the related payment transaction, while a second data element may be configured to store a transaction amount.

The processing server 102 may store the transaction data for each processed electronic payment transaction and may tag each of the payment transactions. In some instances, tags may only be assigned to payment transactions that are determined to be part of a recurring payment transaction. In other instances, tags may be assigned to all or as many payment transactions as able, where the tags may be used in the identification of recurring payment transactions. A consumer may tag a transaction through a computing device 112, as explained below. A tag may be a category, type, or other descriptor associated with a payment transaction that may indicate or otherwise be used in the identification of recurring payment transactions. For example, a payment transaction may be tagged as being associated with a gift purchase or a specific type of gift purchase, such as a birthday, anniversary, Christmas, or a specific person's birthday. Other tags may include, for instance, dental cleaning, house cleaning, vehicle wash, vehicle detailing, vehicle service, oil change, vacation, etc.

In some embodiments, an electronic payment transaction may be tagged by the consumer 104 using a computing device 112. The computing device 112 may be any type of computing device 112 configured to perform the functions discussed herein, such as a desktop computer, laptop computer, notebook computer, tablet computer, cellular phone, smart phone, smart watch, smart television, wearable computing device, implantable computing device, etc. The computing device 112 may be configured to communicate with the processing server 102 via any suitable method, such as a web page, application program, application programming interface, e-mail, short message service message, etc. The consumer 104 may use the computing device 112 to provide a tag for a processed electronic payment transaction. In one example, the consumer 104 may log in (e.g., or otherwise authenticate) to an application program or web site where the consumer 104 may be presented with their transaction history (e.g., a listing of all electronic payment transactions associated with the consumer 104, such as in an account profile associated therewith) where the consumer 104 may provide a tag for each payment transaction using the computing device 112. In another example, when the processing server 102 receives transaction data for a new electronic payment transaction, the processing server 102 may submit a request for a tag to the computing device 112, such as via an application program, short messaging service message, etc., where the consumer 104 may respond with a tag for the electronic payment transaction. In some cases, the processing server 102 may suggest a tag, which may be confirmed or switched by the consumer 104.

In some embodiments, the processing server 102 may be configured to automatically identify tags for processed electronic payment transactions. In such embodiments, the processing server 102 may be configured to parse and analyze the transaction data for an electronic payment transaction to identify a tag associated therewith. For instance, the processing server 102 may identify for specific data that may indicate a payment transaction as belonging to a type associated with a tag. For example, transaction data for a payment transaction may include a merchant category code that is associated with a vehicle servicer, where the payment transaction may thus be tagged as related to vehicle service. In another example, the merchant involved in an electronic payment transaction (e.g., indicated by a merchant identification number included in the transaction data) may be an airline, where the transaction may be tagged as related to vacation or other travel. The processing server 102 may be configured to utilize any available transaction data, which may include, for instance, a transaction time, transaction date, transaction amount, geographic location, currency type, transaction type, product data (e.g., product category, product name, product identifier, etc.), merchant name, merchant category code, merchant identification number, loyalty data, reward data, etc.

In some cases, the processing server 102 may utilize a combination of transaction data and past tags to identify tags for future payment transactions. For instance, if a payment transaction that includes a specific merchant category code has been previously tagged, either by the consumer 104 or, in some cases, other uses, with a specific tag, that same tag may be applied to that payment transaction. In another example, the consumer 104 may tag a first transaction for $50 at a merchant as an incidental or other non-recurring transaction and may tag a second transaction for $300 at the same merchant as a birthday gift, where a new payment transaction at the same merchant may be automatically tagged by the processing server 102 as incidental or a birthday gift depending on the transaction amount.

In the system 100, the consumer 104 may be able to modify, update, add, remove, or otherwise manage tags via the computing device 112. For instance, the processing server 102 may automatically add tags to electronic payment transactions, but enable the consumer 104 to modify or change tags, such as to correct incorrectly placed tags or to provide further information regarding tags. For instance, the processing server 102 may tag an electronic payment transaction as a birthday gift as a similar transaction occurs on or near the same date each year, while the consumer 104 may provide for additional information by modifying the tag to be associated with a specific person's birthday. In such cases, the processing server 102 may (e.g., with or without assistance of the consumer 104) have tags for multiple birthdays for which the consumer 104 may conduct electronic payment transactions.

For each tag that may correspond to a recurring transaction, the processing server 102 may identify and store a period of time associated therewith. The period of time may be an average, median, or expected time between recurring payment transactions that share a specific tag. For example, a birthday tag may have a period of 365 days, whereas a house cleaning tag may have a period of 30 days. In some cases, a predetermined period of time may be automatically identified by the processing server 102 based on the transaction data for the payment transactions that share a tag. In other cases, the consumer 104 may, via the computing device 112, submit a period of time for a specific tag. In some instances, the processing server 102 may identify a period of time, which may be confirmed or adjusted by the consumer 104 accordingly. In some cases, the processing server 102 may identify a period of time based on information submitted by the consumer 104 in addition to transaction data. For example, the consumer 104 may add an anniversary as a recurring payment transaction for which they need to shop, and provide the date of the actual anniversary. However, as gifts are often purchased ahead of time, the processing server 102 may set the period of time to begin/end at a date prior to the actual anniversary date, such as based on prior electronic payment transactions that are tagged for the anniversary or other information provided by the consumer 104. For instance, the consumer 104 may provide the processing server 102 with preferences as to the amount of notice before a period is set to expire.

The processing server 102 may monitor electronic payment transactions processed using the transaction account(s) assigned to a consumer 104 and continue to tag payment transactions and monitor the periods of time associated therewith. When a period of time expires, or when a time ahead of the expiration of a period of time occurs, as applicable, the processing server 102 may be configured to provide a purchase recommendation to the consumer 104. The purchase recommendation may be a recommendation for a future electronic payment transaction for a specific tag that is based on at least the transaction data for past electronic payment transactions that are also associated with that tag. For instance, the processing server 102 may identify commonalities between past electronic payment transactions associated with the tag, and may use the commonalities to make a recommendation for a future purchase. For example, if the consumer 104 always spends around the same transaction amount and at the same merchant or at merchants sharing a merchant category code, the purchase recommendation may be to spend around that same transaction amount at the same merchant or a merchant that has the same merchant category code. The processing server 102 may electronically transmit a notification to the consumer 104 via the computing device 112 that indicates accordingly, such as a message in the above example stating: "Do not forget, you need to buy a gift for John's birthday coming up in two weeks. Usually you get him something from a sporting goods store around $200." In some cases, the processing server 102 may provide a recommendation for one or more specific products, such as may be identified using available data, which may be provided by merchant systems 108 or a suitable third party. For instance, in the above example, the processing server 102 may suggest a specific product or combination of products at a sporting goods store that costs around $200. In some instances, the processing server 102 may be configured to identify coupons, discounts, or other deals that may be associated with a recommendation, and may provide them to the consumer 104 as part of or accompanying the recommendation.

In some embodiments, the consumer 104 may also provide preferences for use by the processing server 102 in identifying purchase recommendations. For instance, the consumer 104 may provide preferences for all recommendations (e.g., preferred merchants, transaction amounts, types of coupons, if a coupon must always be included, etc.) or may provide preferences for specific recurring payment transactions. For example, the consumer 104 may set a transaction amount for recommendations for birthday tags corresponding to how much the consumer 104 would like to spend for each particular birthday, where the processing server 102 may come up with product recommendations that fall within the set transaction amount, but may still be based on prior transaction history. For instance, the processing server 102 may suggest a specific merchant, type of merchant, or product based on prior electronic payment transactions, which still complies with the criteria set by the consumer 104. In some embodiments, the processing server 102 may identify recommendations based on past electronic payment transactions associated with other consumers. In such embodiments, the processing server 102 may identify other consumers with similar transaction histories of the consumer 104, and may identify product recommendations based on the transaction histories of the other consumers. For example, if other consumers also spend around the same amount at the same type of merchants as the consumer 104 for Christmas, but where the other consumers have already made Christmas purchases ahead of the consumer 104, those purchases may be used when identifying recommendations for the consumer 104. In some cases, the purchases of other consumers may only be used if explicitly consented to by the consumer 104 and/or by each of the other consumers.

In some cases, the processing server 102 may receive feedback from the consumer 104, which may be used to improve future identifications of purchase recommendations. For instance, when a purchase recommendation is provided to the consumer 104, the consumer 104 may indicate if the recommendation is suitable or unsuitable, and may also provide reasons why. The processing server 102 may receive the information from the consumer 104 (e.g., via the computing device 112), and may adjust any algorithms or rules associated with the consumer 104 for use in future purchase recommendations. For instance, the processing server 102 may recommend a merchant that the consumer 104 does not like or a product or brand that may not be suitable for a specific type of purchase, where the consumer 104 may indicate accordingly. The processing server 102 may store such data in the consumer's account profile, where future purchase recommendations for a specific tag or any tag may utilize the data. For example, the processing server 102 may suggest a specific brand of clothing for purchase by the consumer 104 for a birthday gift, which the consumer 104 may find to be unsuitable (e.g., the recipient may have a dislike of that brand). The processing server 102 may then avoid making recommendations for products from that specific brand for that birthday gift in the future. In some cases, such feedback may also be used to identify other consumers similar to the consumer 104 for use in providing recommendations based on other consumer purchases.

The methods and systems discussed herein enable a consumer 104 to receive electronic purchase recommendations that are both timely and specifically suited to not only the consumer 104 but to a specific recurring purchase to be made by the consumer 104. By utilizing the consumer's unique transaction history, the processing server 102 may identify when recurring payment transactions occur, may identify when a new payment transaction of a specific type is expected to happen, and may provide a recommendation for the consumer 104 based on their past history that is specifically tailored to that expected purchase. For instance, the processing server 102 may provide precise gift recommendations for birthdays and anniversaries, suitable coupons or deals ahead of a needed vehicle service, and a reminder of the specific dentist they have been using for their dental cleaning (and that they still need to have theirs done). As a result, the consumer 104 does not need to schedule their own reminders for recurring transactions, remember any details of past transactions, or look into what kinds of purchases they should make. Thus, the processing server 102 can save consumers significant time and effort for future payment transactions, as well as preventing forgetfulness that may adversely affect a consumer's health, well-being, or relationships.

Processing Server

Figure 2:
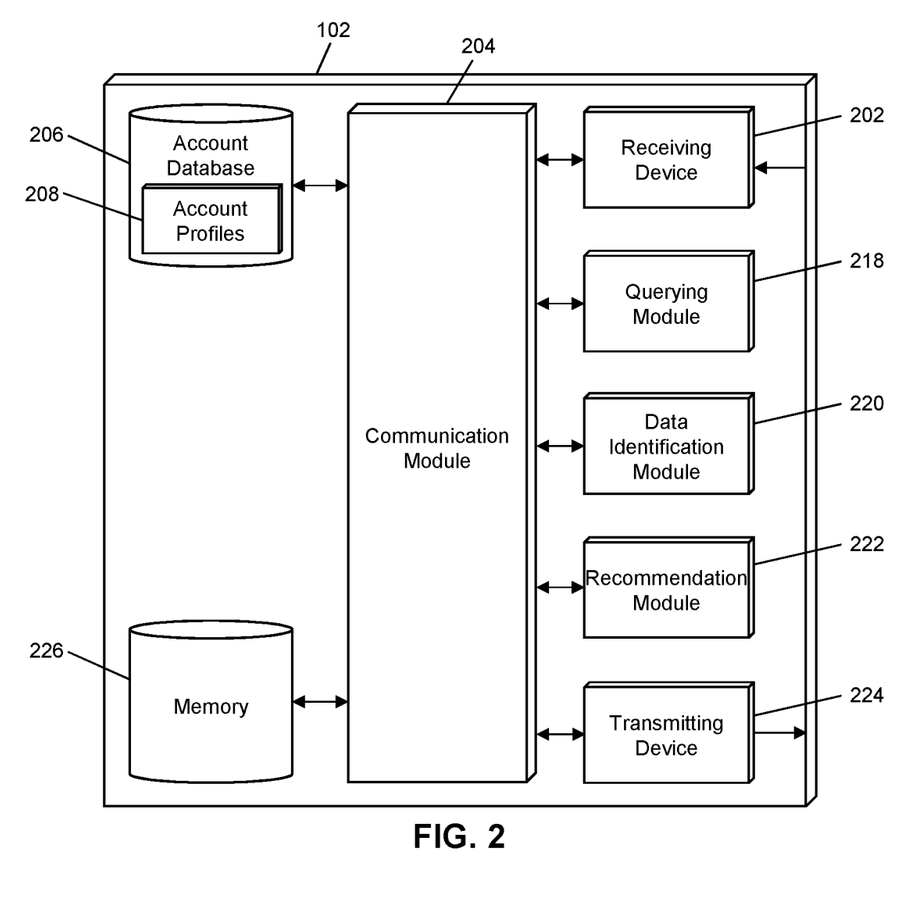
FIG. 2 is a block diagram illustrating the processing server of the system of FIG. 1 for providing electronic purchase reminders and recommendations in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from issuing institutions 110, merchant systems 108, payment networks 110, computing devices 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by payment networks 110 and/or issuing institutions 106 that are superimposed or otherwise encoded with transaction data associated with one or more transaction accounts. In some cases, transaction data may be included in transaction messages, which may be compliant with one or more standards, such as ISO 8583 or ISO 20022. The receiving device 202 may also be configured to receive data signals electronically transmitted from computing devices 112 that may be superimposed or otherwise encoded with tag management data, predetermined period of time data, recommendation feedback, consumer preferences, or other data to be used by the processing server 102 in providing the services to consumers 104 as discussed herein. In some embodiments, the receiving device 202 may also be configured to receive data signals electronically transmitted by merchant systems 108, such as may be superimposed or otherwise encoded with product data, offer data, or other data for use in identifying purchase recommendations based on past transaction data.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, data identification module 220, recommendation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to one or more transaction accounts. An account profile 208 may include, for example, an account identifier associated with each transaction account related to the account profile 208, such as a primary account number or other data used to match a payment transaction to the account profile 208, and a plurality of transaction data entries. Each transaction data entry may be related to an electronic payment transaction funded via the related transaction account(s) and include transaction data for the related transaction including at least a transaction date and other transaction data, and may also include one or more tags that have been associated with the transaction. In some cases, an account profile 208 may also include preferences, criteria, feedback data, and other information provided by the consumer 104 associated with the related transaction account(s) or otherwise identified by the processing server 102 as discussed herein, which may be used in the identification of purchase recommendations. Each account profile 208 may also include, for each tag that has been assigned to a transaction data entry in the account profile, a recurring period of time. In some cases, a recurring period of time may also have one or more additional dates assigned thereto, such as where the period of time may indicate when a transaction is expected related to a birthday that occurs after the transaction.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to insert new transaction data as received from the payment network 110 based on an account identifier, or to identify all transaction data associated with a specific tag for use in identifying a purchase recommendation.

The processing server 102 may also include data identification module 220. The data identification module 220 may be configured to identify data for the processing server 102 for the performing of the functions associated therewith as discussed herein. The data identification module 220 may receive instructions as input, may identify data based on the instructions, and may output the identified data to another module or engine of the processing server 102. For example, the data identification module 220 may be configured to identify when a recurring period of time for a specific tag is set to expire based on a present date and the length of time since the last payment transaction was processed that is assigned with that specific tag. The data identification module 220 may also be configured to identify one or more tags for newly received electronic payment transaction, such as based on the transaction data for that payment transaction and historical transaction data stored in an associated account profile 208, such as by comparing transaction data. The data identification module 220 may also be configured to identify a recurring period of time for a tag based on the transaction date for each of the transaction data entries that have been associated with that tag. In some cases, the data identification module 220 may be configured to include or account for data received from a consumer 104 associated with an account profile 208 when identifying tags and periods of time.

The processing server 102 may also include a recommendation module 222. The recommendation module 222 may be configured to identify purchase recommendations for the processing server 102. The recommendation module 222 may be provided with a set of transaction data entries that are associated with a tag, and analyze the transaction data included in each to identify a purchase recommendation, and may output that recommendation to another module or engine of the processing server 102. In some cases, the recommendation module 222 may also use additional data in identifying a purchase recommendation, such as consumer-supplied criteria (e.g., read from the associated account database 208), merchant or product offers, payment transactions associated with other consumers, etc.

The processing server 102 may also include a transmitting device 224. The transmitting device 224 may be configured to transmit data over one or more networks via one or more network protocols. In some instances, the transmitting device 224 may be configured to transmit data to issuing institutions 106, payment networks 110, computing devices 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to issuing institutions 106 and/or payment networks 110, which may be superimposed or otherwise encoded with requests for transaction data, and may include one or more account identifiers for which transaction data is requested. The transmitting device 224 may also be configured to electronically transmit data signals to computing devices 112, which may be superimposed or otherwise encoded with purchase recommendations, tag suggestions, transaction data for tagging, feedback requests, authentication requests, or other data that may be used in the performing of the functions discussed herein.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, algorithms for identifying recommendations, criteria for matching similar consumers, weighting values for transaction data, offer data, product data, etc.

Process for Providing Electronic Purchase Recommendations

Figure 3:
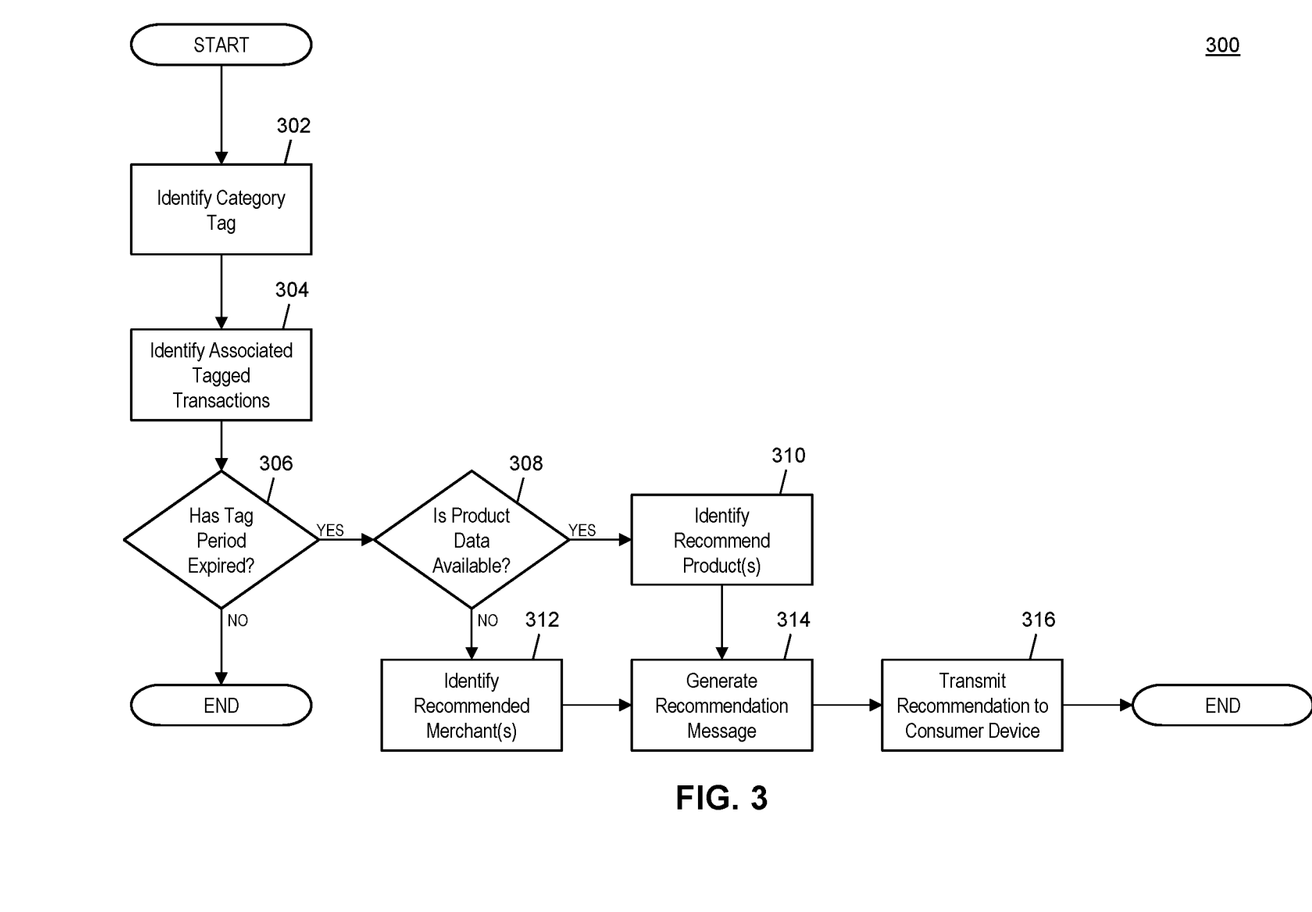
FIG. 3 is a flow diagram illustrating a process for providing an electronic purchase recommendation for a recurring transaction by the processing server of FIG. 2 in accordance with exemplary embodiments.

FIG. 3 illustrates an example process 300 executed by the processing server 102 of FIG. 2 in the system 100 of FIG. 1 for identifying and providing an electronic purchase recommendation to a consumer 104 for an expected iteration in a recurring payment transaction.

In step 302, the data identification module 220 of the processing server 102 may identify a category tag that has been identified by or for a consumer 104. In some cases, the category tag may be identified upon the receipt, by the receiving device 202 of the processing server, of a request by the consumer 104, such as to evaluate existing tags or creating the category tag. In step 304, the querying module 218 of the processing server 102 may execute a query on the account database 206 to identify, in the account profile 208 associated with the consumer 104, a set of transaction data entries that are associated with the specific tag and the recurring time period associated with that tag. In step 306, the data identification module 220 may identify if the recurring time period for that tag has expired. The expiration of the period may be based on the length of the recurring period, and the transaction date for the most recent payment transaction included in the identified set. If the period has not expired, then the process 300 may be completed, as the period is still ongoing for that tag. In some cases, the process 300 may return to step 302 and a new tag evaluated.

If, in step 306, the data identification module 220 determines that the recurring period of time has expired, then, in step 308, the data identification module 220 may determine if product data for payment transactions are available. The determination may be based on looking at the transaction data included in the set of transaction data entries to determine if product-level data has been received. If such data is available, then, in step 310, the recommendation module 222 of the processing server 102 may identify one or more products recommended for purchase based on the product data and other transaction data included in the set of transaction data entries associated with the tag. For example, the recommendation module 222 may determine that products of a specific type and price are regularly purchased as part of the transactions associated with the tag, and may recommend products of similar type and price. If product-level data is not available, then, in step 312, the recommendation module 222 may identify recommendations with respect to one or more merchants based on the available transaction data. For example, the recommendation module 222 may identify that the consumer 104 regularly spends a specific amount at a specific merchant as part of the transaction associated with the tag, and may recommend that merchant and that same transaction amount.

Once a purchase recommendation has been identified, then, in step 314, the processing server 102 may generate a data message that includes the purchase recommendation. In some cases, the data message may be of a format specified by the consumer 104, such as may be indicated in the associated account profile 208. For example, the consumer 104 may set a preference as to how to receive recommendations, such as via e-mail, short messaging service, push notification, etc. In step 316, the transmitting device 224 of the processing server 102 may electronically transmit the generated data message to the computing device 112 associated with the consumer 104 (e.g., as identified in the account profile 208), where the computing device 112 may display the data message, and thus the included purchase recommendation, to the consumer 104.

Exemplary Method for Providing Electronic Purchase Reminders

Figure 4:
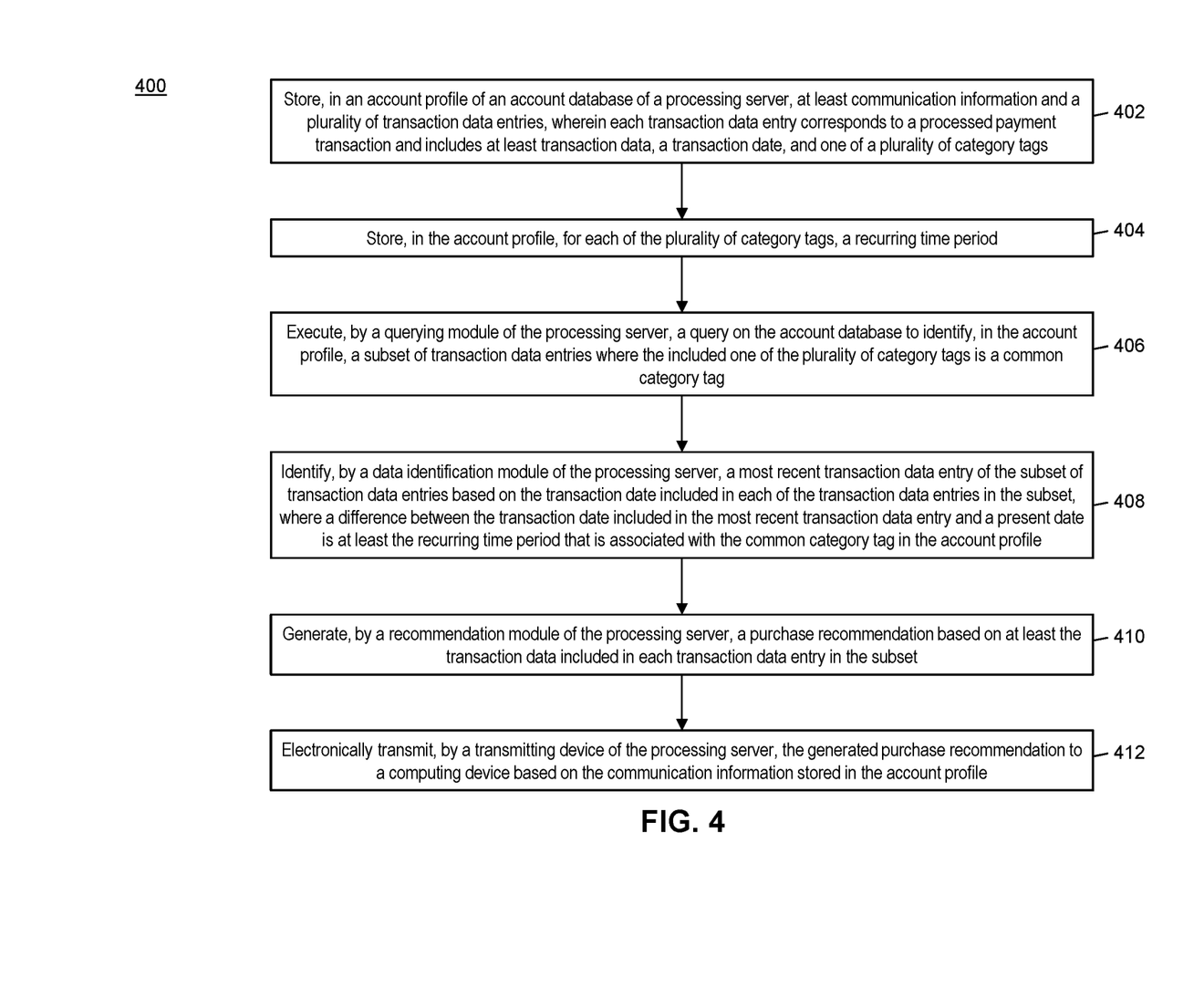
FIG. 4 is a flow chart illustrating an exemplary method for providing electronic purchase reminders in accordance with exemplary embodiments.

FIG. 4 illustrates a method 400 for the providing of electronic purchase reminders including a purchase recommendation after a period of time for a recurring payment transaction type based on historical transaction data.

In step 402, at least communication information and a plurality of transaction data entries may be stored in an account profile (e.g., account profile 208) of an account database (e.g., the account database 206) of a processing server (e.g., the processing server 102), wherein each transaction data entry corresponds to a processed payment transaction and includes at least transaction data, a transaction date, and one of a plurality of category tags. In step 404, a recurring time period may be stored in the account profile for each of the plurality of category tags.

In step 406, a query may be executed on the account database by a querying module (e.g., the querying module 218) of the processing server to identify, in the account profile, a subset of transaction data entries where the included one of the plurality of category tags is a common category tag. In step 408, a most recent transaction data entry of the subset of transaction data entries may be identified by a data identification module (e.g., the data identification module 220) of the processing server based on the transaction date included in each of the transaction data entries in the subset, where a difference between the transaction date included in the most recent transaction data entry and a present date is at least the recurring time period that is associated with the common category tag in the account profile.

In step 410, a purchase recommendation may be generated by a recommendation module (e.g., the recommendation module 222) of the processing server based on at least the transaction data included in each transaction data entry in the subset. In step 412, the generated purchase recommendation may be electronically transmitted by a transmitting device (e.g., the transmitting device 224) of the processing server to a computing device (e.g., the computing device 112) based on the communication information stored in the account profile.

In one embodiment, the transaction data may include at least a merchant category code, and the generated purchase recommendation may include a recommended merchant category code based on the merchant category code included in each of the transaction data entries in the subset. In some embodiments, the transaction data may include at least product data, and the generated purchase recommendation may include a recommended product identifier based on the product data included in each of the transaction data entries in the subset. In one embodiment, the transaction data may include at least a transaction amount, and the generated purchase recommendation may include a recommended transaction amount based on the transaction amount included in each of the transaction data entries in the subset.

In some embodiments, the plurality of transaction data entries may correspond to payment transactions funded using a plurality of different transaction accounts. In one embodiment, the method 400 may further include receiving, by a receiving device (e.g., the receiving device 202) of the processing server, the common category tag and the recurring time period associated with the common category tag from the computing device, wherein the common category tag and the recurring time period is received prior to storage in the account profile. In some embodiments, the method 400 may also include receiving, by a receiving device of the processing server, the present time from the computing device prior to execution of the query, wherein the generated purchase recommendation is electronically transmitted to the computing device in response to receiving the present time. In one embodiment, the plurality of category tags may include at least one of: birthday, anniversary, holiday, oil change, service appointment, physical, cleaning, and vacation.

Computer System Architecture

Figure 5:
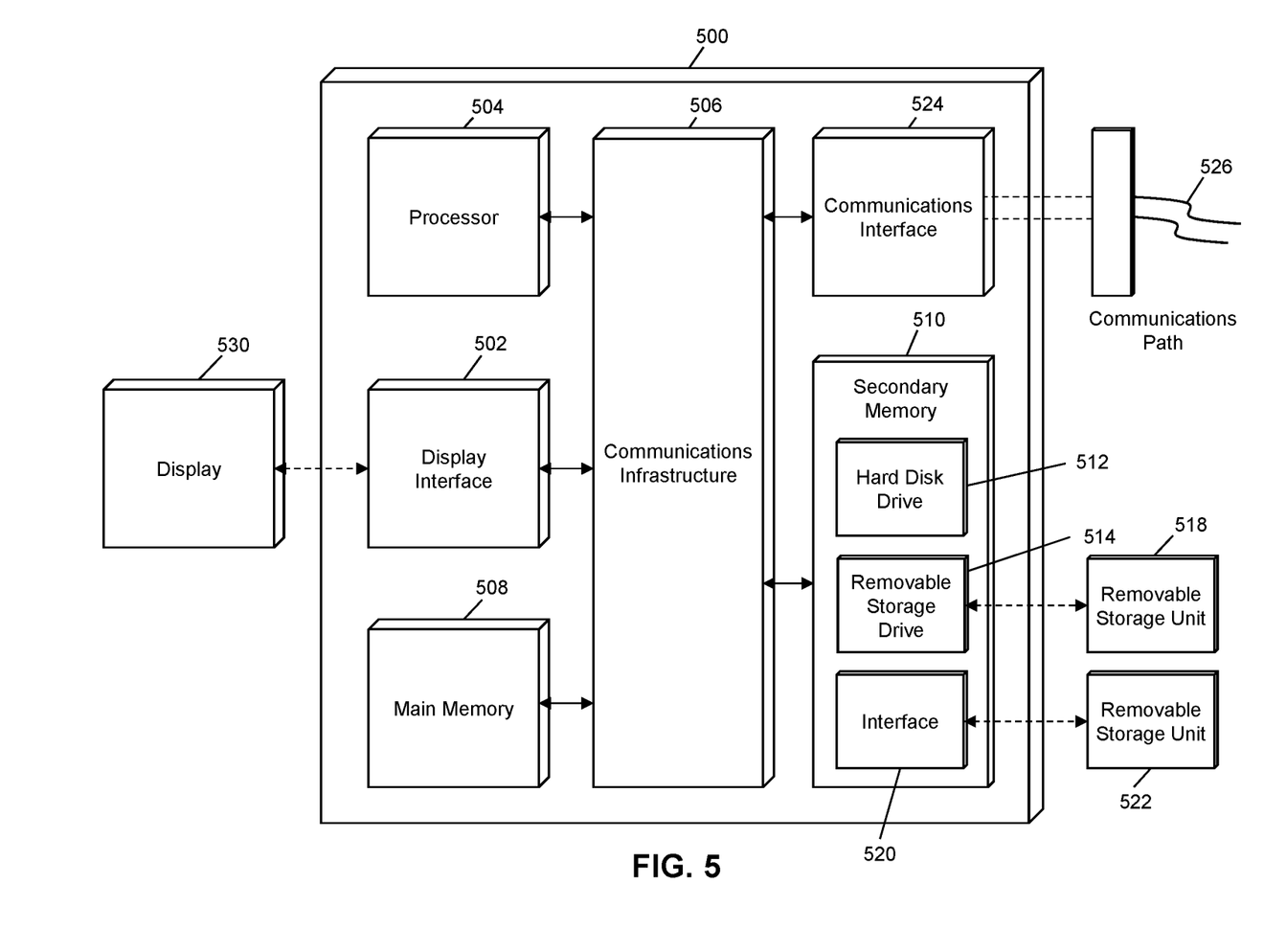
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for providing electronic purchase reminders. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing electronic purchase reminders, comprising:

communicating, by a processing server, with a plurality of issuing institutions and receiving therefrom, upon successful processing of payment transactions by respective issuing institutions, transaction data for processed payment transactions;

storing, in an account database of the processing server, a plurality of account profiles, wherein each account profile is associated with a respective transaction account issued by an issuing institution of the plurality of issuing institutions and includes at least communication information and a plurality of transaction data entries, wherein each transaction data entry corresponds to a processed payment transaction funded by the respective transaction account, and includes at least transaction data for the processed payment transaction received from the respective issuing institution, a transaction date, and one of a plurality of category tags;
storing, in each account profile, of the plurality of account profiles stored in the account database of the processing server, for each of the plurality of category tags, a recurring time period;
executing, by a querying module of the processing server, a query on the account database to identify, in an account profile from the plurality of account profiles, a subset of transaction data entries where the included one of the plurality of category tags is a common category tag;
identifying, by a data identification module of the processing server, a most recent transaction data entry of the subset of transaction data entries based on the transaction date included in each of the transaction data entries in the subset, where a difference between the transaction date included in the most recent transaction data entry and a present date is at least the recurring time period that is associated with the common category tag in the account profile;
generating, by a recommendation module of the processing server, a purchase recommendation based on at least the transaction data included in each transaction data entry in the subset; and
electronically transmitting, by a transmitting device of the processing server, the generated purchase recommendation to a computing device based on the communication information stored in the account profile.

2. The method of claim 1, wherein
the transaction data includes at least a merchant category code, and
the generated purchase recommendation includes a recommended merchant category code based on the merchant category code included in each of the transaction data entries in the sub set.

3. The method of claim 1, wherein
the transaction data includes at least product data, and
the generated purchase recommendation includes a recommended product identifier based on the product data included in each of the transaction data entries in the subset.

4. The method of claim 1, wherein the transaction data includes at least a transaction amount, and
the generated purchase recommendation includes a recommended transaction amount based on the transaction amount included in each of the transaction data entries in the subset.

5. The method of claim 1, wherein the plurality of transaction data entries correspond to payment transactions funded using a plurality of different transaction accounts, each transaction account being associated with an issuing institution from the plurality of issuing institutions with which the processing server communicates.

6. The method of claim 1, further comprising:
receiving, by a receiving device of the processing server, the common category tag and the recurring time period associated with the common category tag from the computing device, wherein the common category tag and the recurring time period is received prior to storage in the account profile.

7. The method of claim 1, further comprising:
receiving, by a receiving device of the processing server, the present time from the computing device prior to execution of the query, wherein the generated purchase recommendation is electronically transmitted to the computing device in response to receiving the present time.

8. The method of claim 1, wherein the plurality of category tags includes at least one of: birthday, anniversary, holiday, oil change, service appointment, physical, cleaning, and vacation.

9. A system for providing electronic purchase reminders, comprising:
a receiving device, of a processing server, configured to communicate with a plurality of issuing institutions and receive therefrom, upon successful processing of payment transactions by respective issuing institutions, transaction data for processed payment transactions;
an account database of the processing server configured to store a plurality of account profiles, wherein
each account profile is associated with a respective transaction account issued by an issuing institution of the plurality of issuing institutions and includes at least communication information and a plurality of transaction data entries, wherein each transaction data entry corresponds to a processed payment transaction funded by the respective transaction account, and includes at least transaction data, a transaction date, and one of a plurality of category tags, and
each account profiles stores, for each of the plurality of category tags, a recurring time period;
a querying module of the processing server configured to execute a query on the account database to identify, in an account profile, from the plurality of account profiles, a subset of transaction data entries where the included one of the plurality of category tags is a common category tag;
a data identification module of the processing server configured to identify a most recent transaction data entry of the subset of transaction data entries based on the transaction date included in each of the transaction data entries in the subset, where a difference between the transaction date included in the most recent transaction data entry and a present date is at least the recurring time period that is associated with the common category tag in the account profile;
a recommendation module of the processing server configured to generate a purchase recommendation based on at least the transaction data included in each transaction data entry in the subset; and
a transmitting device of the processing server configured to electronically transmit the generated purchase recommendation to a computing device based on the communication information stored in the account profile.

10. The system of claim 9, wherein
the transaction data includes at least a merchant category code, and
the generated purchase recommendation includes a recommended merchant category code based on the merchant category code included in each of the transaction data entries in the sub set.

11. The system of claim 9, wherein
the transaction data includes at least product data, and
the generated purchase recommendation includes a recommended product identifier based on the product data included in each of the transaction data entries in the subset.

12. The system of claim 9, wherein the transaction data includes at least a transaction amount, and
the generated purchase recommendation includes a recommended transaction amount based on the transaction amount included in each of the transaction data entries in the subset.

13. The system of claim 9, wherein the plurality of transaction data entries correspond to payment transactions funded using a plurality of different transaction accounts, each transaction account being associated with an issuing institution from the plurality of issuing institutions with which the processing server communicates.

14. The system of claim 9, further comprising:
a receiving device of the processing server configured to receive the common category tag and the recurring time period associated with the common category tag from the computing device, wherein the common category tag and the recurring time period is received prior to storage in the account profile.

15. The system of claim 9, further comprising:
a receiving device of the processing server configured to receive the present time from the computing device prior to execution of the query, wherein
the generated purchase recommendation is electronically transmitted to the computing device in response to receiving the present time.

16. The system of claim 9, wherein the plurality of category tags includes at least one of: birthday, anniversary, holiday, oil change, service appointment, physical, cleaning, and vacation.

* * * * *